United States Patent
White et al.

[11] Patent Number: 5,970,740
[45] Date of Patent: Oct. 26, 1999

[54] VEHICLE AIR CONDITIONING SYSTEM

[75] Inventors: Ian White, Essex; Ian James Rawley, Hatfield Peverel, both of United Kingdom

[73] Assignee: Ford Motor Company, Dearborn, Mich.

[21] Appl. No.: 09/109,818

[22] Filed: Jul. 2, 1998

[30] Foreign Application Priority Data

Jul. 2, 1997 [GB] United Kingdom ............. 9713909

[51] Int. Cl.[6] ........................................ F25B 39/02
[52] U.S. Cl. ........................ 62/515; 62/292; 62/77; 62/149
[58] Field of Search ..................... 62/292, 77, 149, 62/55

[56] References Cited

U.S. PATENT DOCUMENTS

| | | | |
|---|---|---|---|
| 4,458,497 | 7/1984 | Kubik | 62/77 |
| 4,756,359 | 7/1988 | Greer | 165/43 |
| 5,493,875 | 2/1996 | Kozinski | 62/503 |
| 5,520,015 | 5/1996 | Lukas et al. | 62/506 |
| 5,566,748 | 10/1996 | Christensen | 165/67 |
| 5,735,133 | 4/1998 | Voss et al. | 62/185 |

*Primary Examiner*—Henry Bennett
*Assistant Examiner*—Mark Shulman
*Attorney, Agent, or Firm*—Raymond L. Coppiellie

[57] ABSTRACT

A vehicle air conditioning system 1 includes a condenser 3 which includes one end cap 5 which has an integral charge port 7. The end cap 5 seals the manifold 9 of the condenser. The condenser 3 is a brazed aluminium construction and the end cap 5 and integral charge port 7 are brazed as one unit.

5 Claims, 2 Drawing Sheets

VEHICLE AIR CONDITIONING SYSTEM

FIELD OF THE INVENTION

The invention relates to an improved air conditioning system for a motor vehicle.

Traditionally an air conditioning system for a vehicle includes a condenser, an evaporator, a compressor and a set of hoses used to transport refrigerant fluid through the system. In order to fill the air conditioning system with refrigerant after assembly and for service the system also requires a charge port. The charge port includes a one way valve similar in principal to the valve found on a car tyre. Typically this is brazed onto the hose using a flame. The position of the charge port is often difficult to access and when servicing of the air conditioning system is required the recharging of the system can be awkward.

SUMMARY OF THE INVENTION

According to a first aspect of the invention there is provided an air conditioning system for a vehicle, in which the condenser includes at least one end cap which includes an integral charge port.

In this position there is a reduction in complexity because one part does the job of two which also provides cost savings. Moreover the end cap is readily accessible for servicing of the system.

Preferably the end cap and charge port are brazed as one unit. Preferably the material of the brazed unit is aluminium.

The charge port is of conventional design the choice of which would be apparent to the skilled addressee of the specification.

According to a second aspect of the invention there is provided a condenser for a vehicle air conditioning system which comprises at least one end cap including an integral charge port.

BRIEF DESCRIPTION OF THE DRAWINGS

A vehicle air conditioning system and condenser for use in the system will now be described, by way of example only, with reference to the accompanying drawings, in which.

DESCRIPTION OF THE PREFERRED EMBODIMENT

Figure 1:
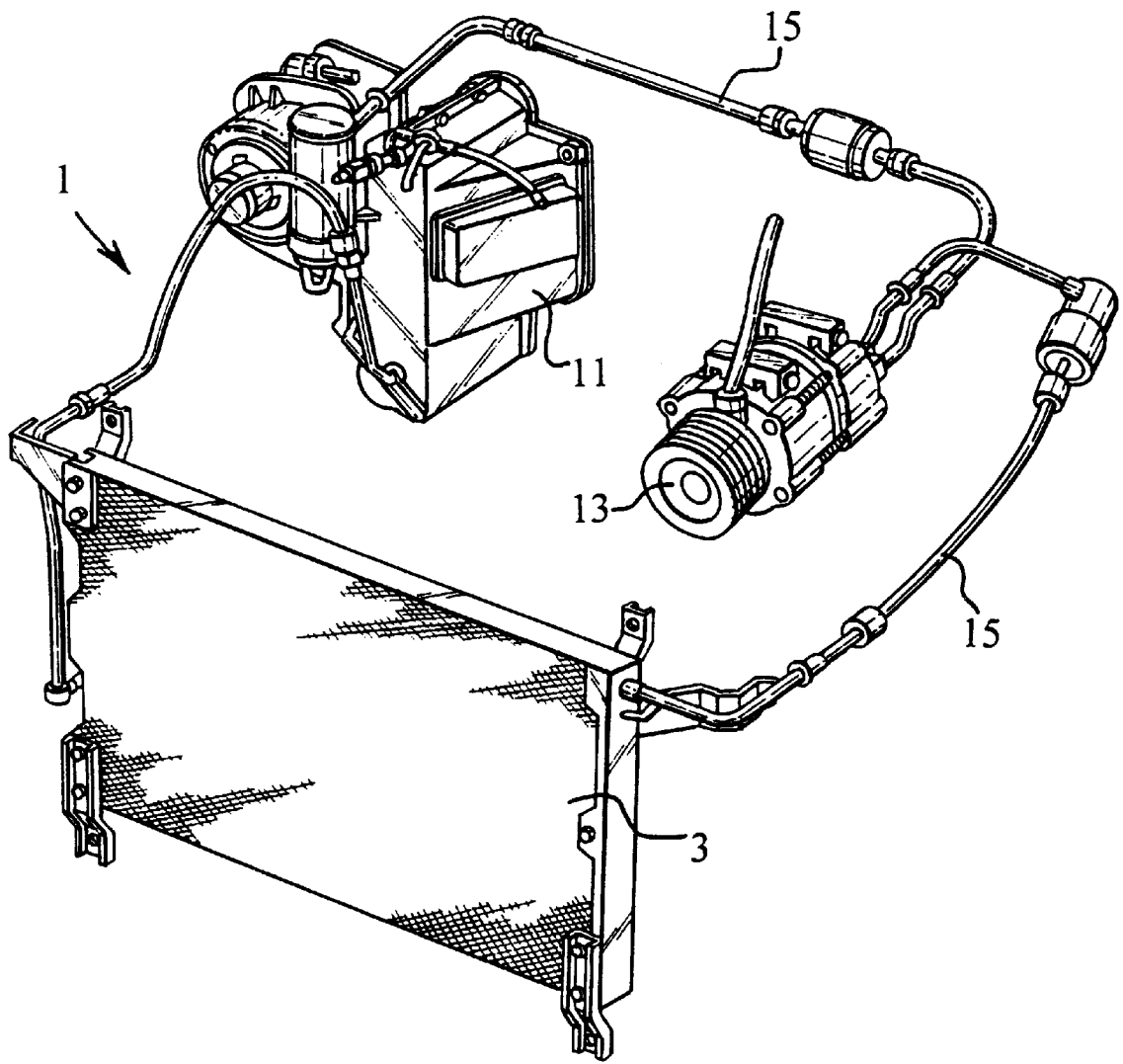
FIG. 1 is a schematic block diagram of the elements of the air conditioning system; and, FIG. 2 is a front view of the end of the condenser.
Figure 2:
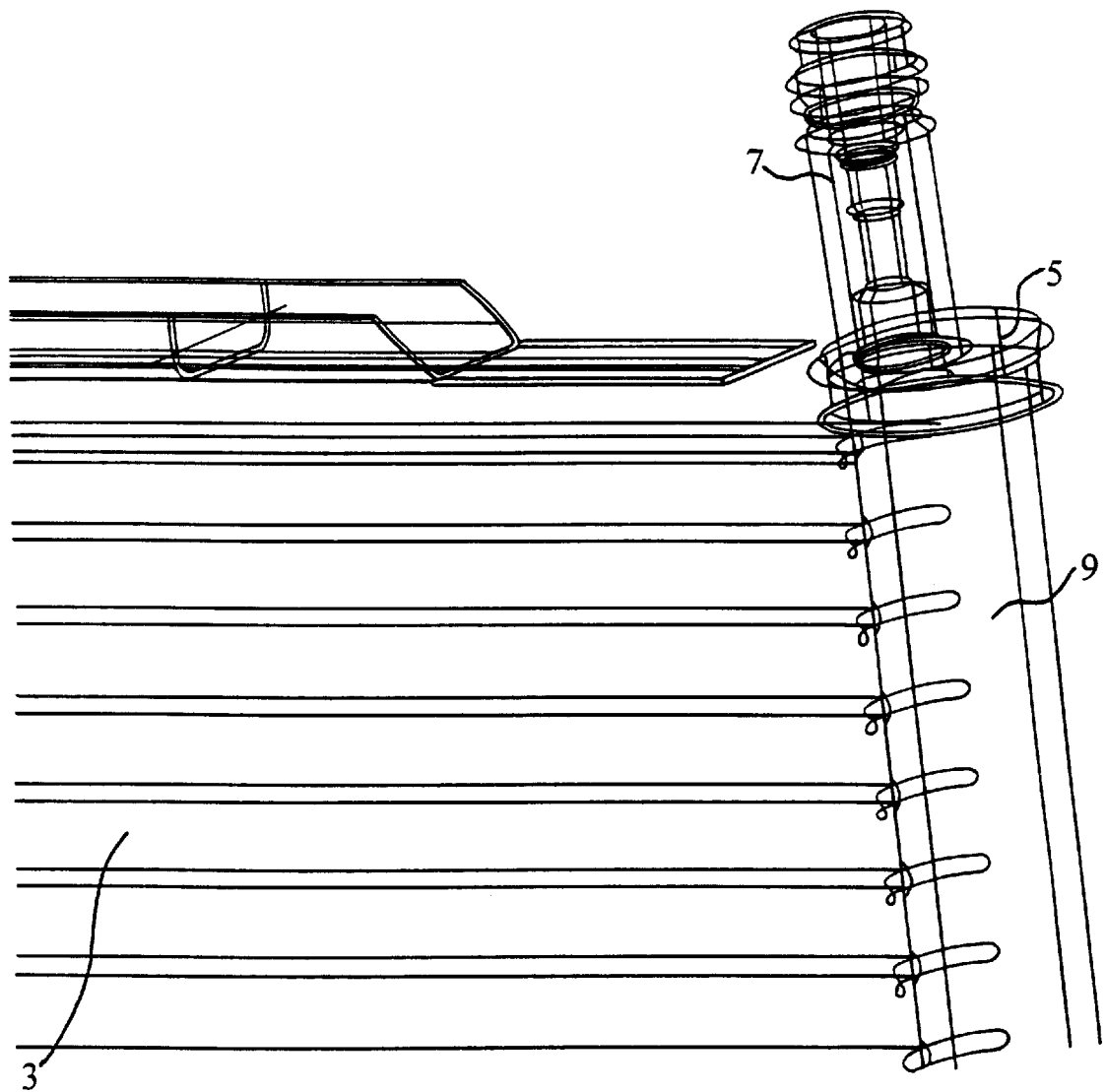

An air conditioning system 1 includes a condenser 3 which includes one end cap 5 which has an integral charge port 7.

The end cap 5 seals the manifold 9 of the condenser. The condenser 3 is a brazed aluminium construction and the end cap 5 and integral charge port 7 are brazed as one unit.

The charge port 7 is of conventional construction and in this case is a conventional Schrader valve.

The air conditioning system 1 also includes evaporator 11 and compressor 13 which are joined by hoses 15. In systems in accordance with the prior art the charge port has been brazed to one of the hoses 15. By incorporating the charge port 7 into the condenser end cap 5, one part is eliminated, thus reducing costs and complexity, and at the same time the charge port 7 is in a more convenient position than in prior systems.

We claim:

1. An air conditioning system for a vehicle, comprising:

an evaporator;

a compressor;

a condenser having a plurality of fluid carrying tubes secured to and in fluid communication with at least one manifold, the manifold defining a fluid carrying chamber and having an end cap at one end thereof, said end cap including a charge port for providing means for filling said system with fluid from an external source, said charge port and end cap being an integral unit.

2. An air conditioning system according to claim 1 in which the end cap and charge port are brazed as one unit.

3. An air conditioning system according to claim 2, in which the material of the brazed unit is aluminium.

4. A condenser for a vehicle air conditioning system which comprises at least one end cap including an integral charge port.

5. An air conditioning system, comprising:

an evaporator;

a compressor;

a condenser having a plurality of fluid carrying tubes secured to an in fluid communication with a pair of manifolds, the manifolds defining a fluid carrying chamber, one manifold of said pair having an end cap at one end thereof, said end cap including a Schrader-type charge port for providing means for filling said system with a refrigerant fluid from an external source, said Schrader-type charge port and said end cap being an integral unit.

* * * * *